United States Patent [19]

Boiarski et al.

[11] Patent Number: 4,878,727

[45] Date of Patent: Nov. 7, 1989

[54] MULTIMODE CHANNEL WAVEGUIDE OPTICAL COUPLING DEVICES AND METHODS

[75] Inventors: Anthony A. Boiarski, Upper Arlington; William M. Myers, Grandview Heights, both of Ohio

[73] Assignee: Battelle Memorial Institute, Columbus, Ohio

[21] Appl. No.: 213,657

[22] Filed: Jun. 30, 1988

[51] Int. Cl.$^4$ .............................................. G02B 6/30
[52] U.S. Cl. ............................. 350/96.17; 350/96.11; 350/96.15
[58] Field of Search ............... 350/96.12, 96.14, 96.15, 350/96.17, 96.11

[56] References Cited

U.S. PATENT DOCUMENTS 3,994,559  11/1976  Crow ............................. 350/96.17

FOREIGN PATENT DOCUMENTS 54-7948    1/1979  Japan ............................ 350/96.17
54-126058  9/1979  Japan ............................ 350/96.17
60-95409   5/1985  Japan ............................ 350/96.17
62-111214  5/1987  Japan ............................ 350/96.17
62-147408  7/1987  Japan ............................ 350/96.17

*Primary Examiner*—Frank Gonzalez
*Assistant Examiner*—John Ngo
*Attorney, Agent, or Firm*—Philip M. Dunson

[57] ABSTRACT

A waveguide, approximately Y-shaped in plan view, provides coupling between first and second optical fibers, each attached to an end of the waveguide on the branched portion of the Y, and a third fiber attached to the single end of the Y. A fourth fiber, smaller in cross section than the waveguide on the single-ended portion of the Y and placed with its adjacent end therein between the junction of the Y and the third fiber, and bent gradually to one side, extends away from the waveguide before reaching the end to which the third fiber is attached. Typically the first fiber directs light from an emitter into the waveguide, the second fiber directs light away from the waveguide to a detector, the third fiber directs light away from the waveguide to a reference detector, and the fourth fiber directs light away from the waveguide to a sensor and back from the sensor into the waveguide.

14 Claims, 3 Drawing Sheets

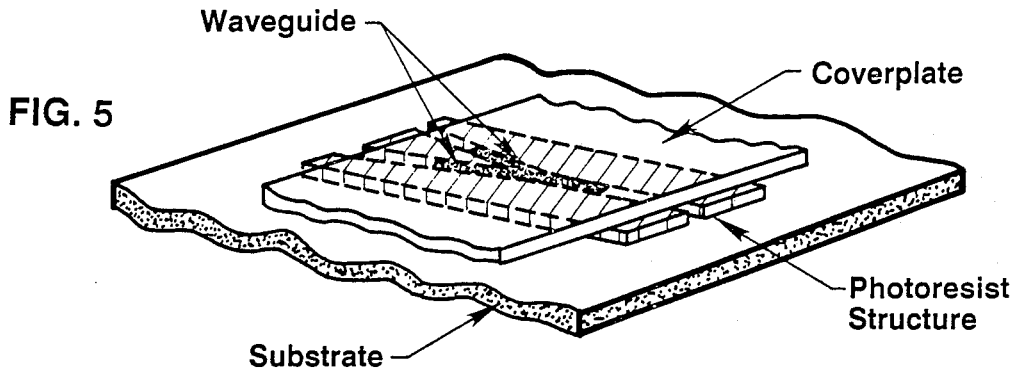
FIG. 5
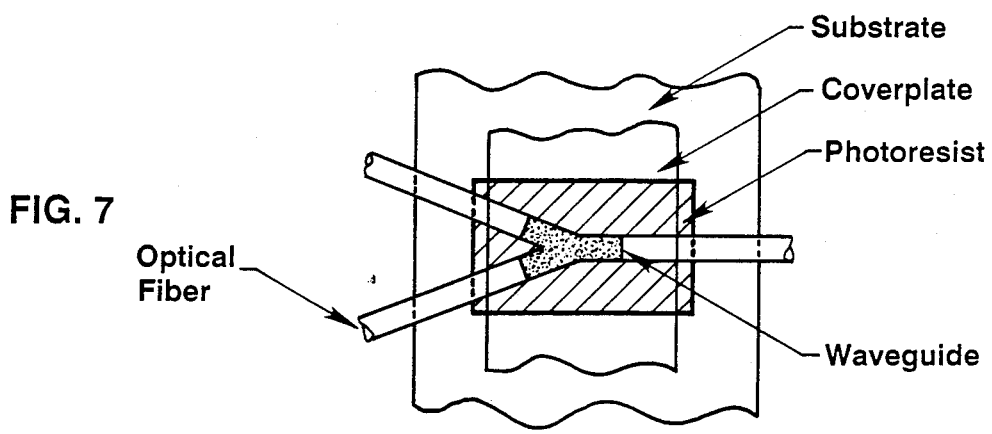
FIG. 7
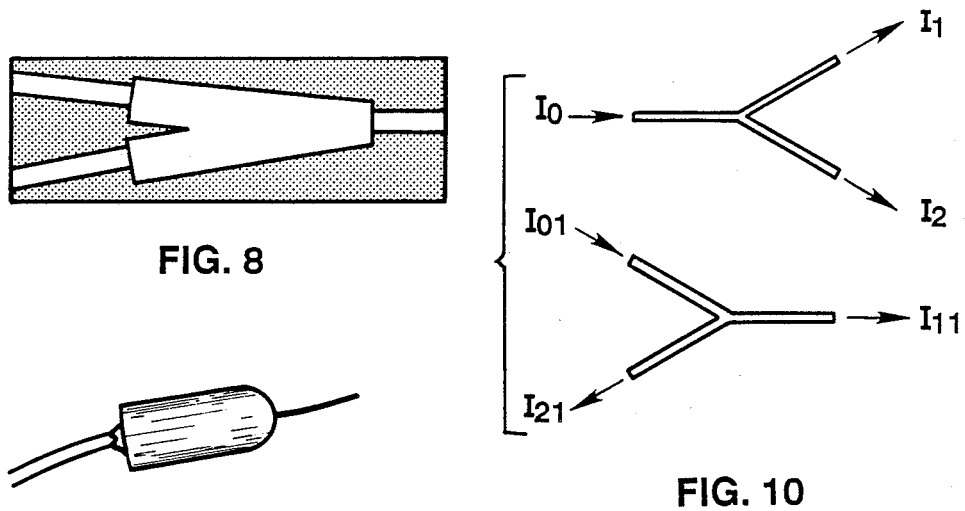
FIG. 8
FIG. 9
FIG. 10

MULTIMODE CHANNEL WAVEGUIDE OPTICAL COUPLING DEVICES AND METHODS

FIELD

This invention relates to devices for optical coupling between multimode fiber optic means by way of multimode channel waveguide means and to methods for fabricating such devices. The methods are especially useful in fabricating devices for combining light from a plurality of optical fibers and transmitting the light into at least one output fiber and for splitting light from at least one fiber optic input path into a plurality of output paths. In other words, the devices typically combine input light, split output light, or both.

Such devices are commonly called N×N (N—by—N) couplers. The N's are whole numbers corresponding to the number of inputs and the number of outputs, which need not be the same. Typical devices can be used in either direction. For example, a 2×3 coupler typically can be used to couple two inputs into three outputs or to couple three inputs into two outputs, whichever is desired.

BACKGROUND

N×N couplers are used extensively in the optical communications industry to route light beams in fiber optic Local Area Networks (LAN). They are used also in fiber optic sensor systems to replace bulk optic components such as beam splitters.

N×N couplers are commercially available for some types of optical fibers, such as glass fibers, but not for some other types, such as plastic fibers and plastic clad silica fibers.

The main reason that N×N coupler devices are not currently available for some kinds of fibers is related to the present methods of fabrication. In typical present methodology, N fibers are grouped together, heated, pulled, and twisted to "fuse" the fiber cores together. The "fused couplers" are the industry standard. Most glass fibers and some plastic fibers are amenable to being used to form fused couplers, but other types are not. Because each splitter is individually fabricated using the twist and pull techniques, the products are expensive and have large variations in splitting characteristics.

The present invention comprises novel methods of fabricating couplers without using the fusing technology. Instead, fibers typically are attached to a photofabricated waveguide which divides and/or combines the light as desired. Hence, this invention provides N×N couplers of types that were not previously available. Further, it can produce multiple copies of couplers simultaneously, which reduces overall cost. Also, the technique can be custom designed to match the properties of a variety of fiber materials of different sizes and numerical apertures.

DRAWINGS

FIG. 5 is a perspective view showing the waveguide structure formed during a step in the typical process.

FIG. 7 is a schematic plan view of a completed device made by the typical method illustrated in FIGS. 1-6.

FIG. 8 is a photograph of a typical Y-splitter made according to the typical method of FIGS. 1-7.

FIG. 9 is a photograph of a device as in FIG. 8 that has been encapsulated.

FIG. 10 is a schematic plan view illustrating typical intensity measurements for calculating excess loss and directivity characteristics of typical devices according to the present invention.

CARRYING OUT THE INVENTION

The following example illustrates typical steps in a method according to the present invention wherein 24 Y-splitters (or combiners), 1×2 or 2×1, were fabricated using plastic fibers 250 micrometers (10 mils) in diameter and having a numerical aperture of 0.5. Of course, the method can be modified in obvious ways to provide N×N couplers having different numbers of inputs and outputs and using fibers of other sizes and apertures.

EXAMPLE

Step 1—Lamination of Resist

Three layers of Riston ® No. 1230, 3 mils thick each, and one layer of Riston ® No. 1215 1.5 mil thick, photoresist are laminated together. Riston ® 1230 and 1215 have the same composition. Riston ® is a typical negative working photoresist material in sheet form. Other similar materials having the proper indexes of refraction may be substituted. The resist layers are laminated to a substrate comprising a 40 mil thick piece of 1"×3" Polycast ® (poly methyl methacrylate (PMMA)) plastic material. This forms a 10.5 mil thick layer of resist. The thickness of resist is selected to match the fiber diameter. The photoresist material was selected for its low refractive index properties (n=1.52).

Step 2—Resist Exposure

Figure 1:
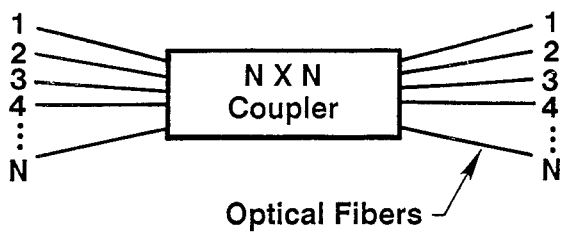
FIG. 1 is a schematic plan view representing a generic N×N coupler.
Figure 2:
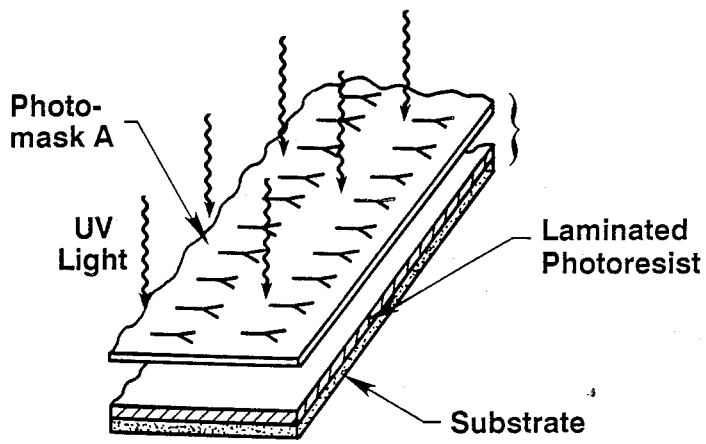
FIG. 2 is a partially exploded perspective view illustrating the exposure of laminated resist through a photomask in a typical step in a method according to the present invention for fabricating Y-splitters.
Figure 3:
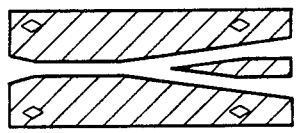
FIG. 3 is an enlarged plan view showing details of a typical photomask element in FIG. 2.

The above resist layer is then exposed to ultraviolet radiation at 1 J/cm² intensity through a photomask as shown in FIGS. 2 and 3. Multiple exposures are performed to produce 24 Y-splitter structures on the 1"×3" polycast surface. One main mask with 6 individual masks is moved to four positions. In mass production, all 24, or typically m any more, will be exposed simultaneously. The resist is hardened where light is allowed to pass through the mask.

Details of the photomask in FIG. 3 are important for providing a low-loss splitter architecture. For example, the angle between the Y-branches should be as small as possible to minimize splitting losses. However, this angle should not be too small or it will be very difficult to fabricate the Y-structure. In the present case an angle of 7.5 degrees was used. As shown in FIG. 3, the Y-junction should be as sharp as possible to avoid losses, and the channels are flared at each end to allow for the cladding thickness of the fiber to fit in one channel portion while allowing the fiber core dimensions to match the waveguide channel width. The flaring improves performance and provides a stop for the fibers when they are placed into the channels.

Step 3—Development

Figure 4:
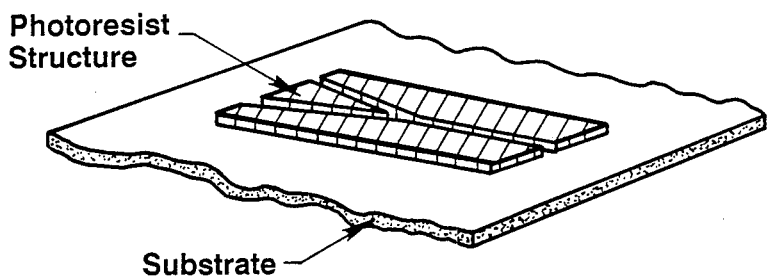
FIG. 4 is a perspective view of one of the many structures formed during a step of the typical process.

The exposed resist image is developed for 4 minutes using 1,1,1 trichloroethane spray to form 24 copies of a structure as shown in FIG. 4. The areas not exposed to ultraviolet light are dissolved by the trichloroethane leaving a groove-like structure (channels) in the form of a "Y". The developed image is rinsed with isopropyl alcohol then air dried.

Step 4—Waveguide Formation

The set of 24 structures arranged in a 2×12 format in the polycast substrate is cut in half to form two linear arrays of 12 Y-splitters each. A 0.04" thick polycast cover plate (superstrate), 174"×3", is placed on top of each row of Y-splitter structures. The superstrate is then fastened to the bottom substrate with ultraviolet curing epoxy (Lightweld ® 305). This forms a sandwich structure of Riston ® between two pieces of Polycast ®.

Figure 6:
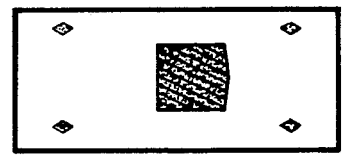
FIG. 6 is a plan view showing the negative of a mask used to form waveguide at the junction of a Y-splitter in a step of the typical method. The fiducial marks in FIG. 5 are aligned with the correspondingly shaped and positioned marks in FIG. 3.

The covered channels (see FIG. 5) of each splitter are then backfilled with Norland ® 61 optical cement from the edge of the unit on the 2 channel side of the Y-splitter. Norland ® is a typical liquid monomer that is optically clear and is polymerized upon exposure to ultraviolet radiation. Other similar materials can be substituted provided they have the proper indexes of refraction. After filling, the Y-structure is exposed for about 60 sec to 6 mw of ultraviolet light intensity through the mask shown in FIG. 6. This process hardens the center region of the Y-structure where the 3 branches meet. The hardened cement forms an optical waveguide as shown in FIG. 5. Each material above was chosen to have the proper index of refraction, n, to produce a waveguide structure having the correct numerical aperture, typically 0.5. Typically, for the substrate and the superstrate, $n=1.49$; for the photoresist, $n=1.52$; and for the waveguide, $n=1.56$.

Step 5—Fiber Attachment

Three fibers are manually attached, one to each of the three channels of the Y-structure, by pushing them into their respective channels until they come up to the stops provided by the exposed resist material. The entire structure is then exposed to flood radiation for 5 minutes using a 5.5 mw black-ray lamp. This final exposure hardens the optical cement around the fibers and also attaches them to the waveguide to form the final structure shown in FIG. 7. See also the photograph in FIG. 8.

Step 6—Dicing and Fiber Preparation

The two sets of 12 units are then cut apart with a dicing saw to yield 24 individual Y-splitters with attached fibers. Jackets are slipped over these fibers and tacked to the polycast substrate.

Step 7—Encapsulation

The Y-splitter is then encapsulated to protect it from shock, vibration, and humidity. Various methods may be used. In this prototype development example, we inserted the splitter into an empty pill capsule and filled the capsule with 5 minute epoxy that had been blackened with activated charcoal powder. A photograph of the final product is shown in FIG. 9.

Various conformal coatings having low indexes of refraction can be placed on top of the waveguide channel surface before filling the channel with the liquid monomer material. The purpose of the coating is to increase the index difference between the waveguide and the channel wall, which will increase the numerical aperture of the waveguide structure so that it matches the numerical aperture of the fiber. Typical suitable coating materials are sputtered silicon dioxide and plasma polymerized coatings such as polytetrafluoroethelene.

Performance Data

The transmission and splitting performance of several splitters were measured at three wavelengths of interest (i.e. 633, 660, and 820 nm). The measurements required to obtain performance data and pertinent equations to calculate these data are given in FIG. 10. The table provides a summary of results from the performance measurements.

TABLE

AVERAGE PERFORMANCE CHARACTERISTICS FOR A NUMBER OF FABRICATED Y-SPLITTERS

| Wavelength | Numerical Aperture, N.A. | Mean Excess Loss (Split) (dB) | Mean Loss (Combine) (dB) | Directivity (dB) |
|---|---|---|---|---|
| 633* | 0.01 | 2.3 | 2.4 | 26 |
| 660 | 0.50 | 1.7 | 4.8 | 26 |
| 820 | 0.30 | 1.7 | 3.2 | 23 |

*Laser source, otherwise LED

The data in the table indicate that the novel fabrication technique described above produces Y-splitters with good loss characteristics. A major source of loss results from the fact that the waveguides are square and the fibers are round. This geometry mismatch results in an additional 1 dB excess loss which could be eliminated by rounding the corners of the waveguide.

The data also indicate that the combining efficiency of the device improves with a smaller source numerical aperture (N.A.). Therefore, a laser source (N.A.=0.01) provides better performance than is obtained with a high N.A. (0.5) LED source because of the laser's lower input light divergence.

The directivity results in the table are indicative of the cross talk from one of the Y-channels with the other. Values of near 30 dB isolation were expected. Bubbles at the end of the fiber in the single channel of the "Y" caused retro-reflection which resulted in higher cross talk than expected. When these bubbles were absent, 30 dB directivity was obtained.

Figure 11:
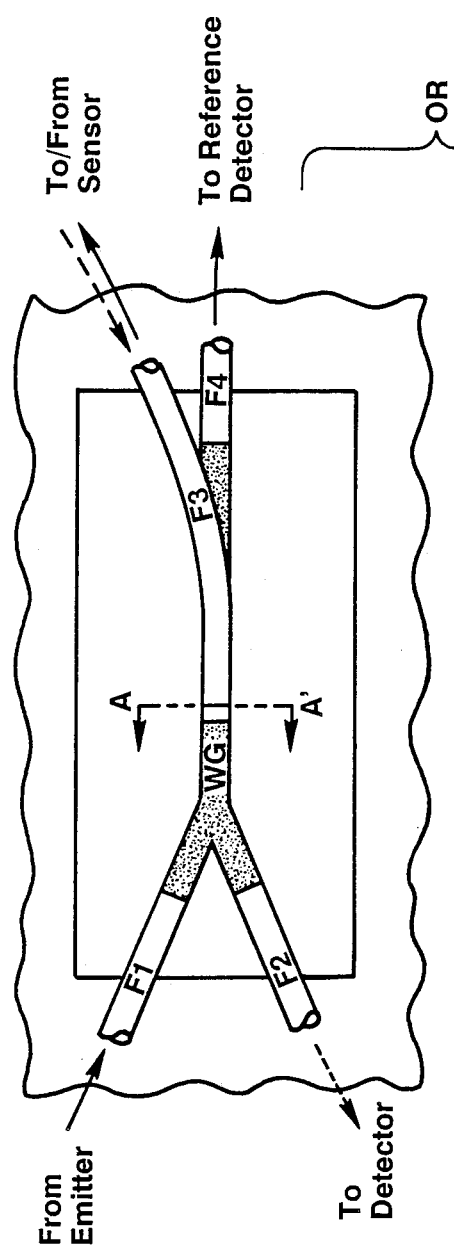
FIG. 11 is a schematic plan view of a typical 1×2 fiber optic coupler with reference tap according to the present invention.

For some applications, namely fiber optic sensing, a modification of the above basic 1×2 design would be desired. In fiber optic sensing, light from an emitter is coupled to a sensor using the 1×2 coupler as shown in FIG. 11. In this case, light from the emitter enters the coupler through the fiber F1 and exits through the fiber F3. Return light from the sensor reenters the coupler via the fiber F3 and is directed to a detector through the fiber F2. The Y-shaped waveguide accomplishes the light coupling operations. In many cases, however, it is necessary to also monitor the emitter intensity in order to cancel out effects due to emitter intensity variations with time. Therefore, a reference tap is required which taps off a part of the waveguide coupled light from the emitter.

FIG. 11 shows a special design that provides the reference intensity without sacrificing coupler performance. As shown in FIG. 11, the fiber F3 is bent allowing light that is not coupled into the fiber F3 to travel down a length of straight waveguide and be coupled into the fiber F4. This fiber is connected to a second detector, which acts as a reference to monitor emitter intensity variations.

Figure 12:
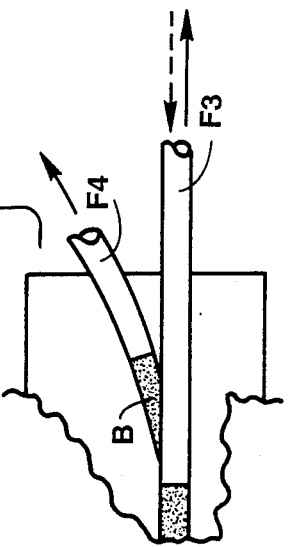
FIG. 12 is a sectional view taken in the plane A—A' in FIG. 11 to show the interface between the waveguide and the fiber F3 where reference light is fed to the fiber F4.
Figure 12:
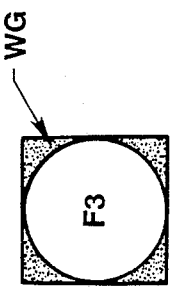

Waveguided light can enter the reference fiber F4 because of losses at the interface between the waveguide and the fiber F3. In FIG. 12, a cross section view of this interface is shown. Because of the geometry mismatch (square waveguide to round fiber) some of the light in the waveguide is not coupled into the fiber F3. The amount of light ordinarily lost is a function of a ratio of the fiber area to the waveguide area, or $$\text{loss} = 1 - \frac{\pi D^2}{4D^2} = 1 - \frac{\pi}{4} = 0.215,$$

where D is the diameter of the fiber F3.

These calculations indicate that 21.5 percent of the light traveling in the waveguide does not get coupled into the fiber F3. Instead it travels down the straight portion of the odd-shaped waveguide surrounding the fiber F3. Approximately one-half of this waveguide transmitted light is coupled into the reference tap fiber F4. So approximately 5 percent of the initial light in the fiber F1 is tapped off by the fiber F4. This light would have been lost in an ordinary 1×2 splitter, so the reference tap is accomplished without added loss.

A 1×2 coupler with tap following the design in FIG. 11, was built and tested. Results showed that approximately 8 percent of the light entering the fiber F1 was coupled into the fiber F4.

Another convenient arrangement for the fibers F3 and F4 is shown in the lower right portion of FIG. 11. In this alternative arrangement the fiber F3 is straight, and a short branch B of waveguide continues at a small angle from the main section. This branch is coupled into the fiber F4.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

What is claimed is:

1. A method of fabricating a device for optical coupling between multimode fiber optic means via multimode channel waveguide means comprising
    providing a substrate having a predetermined relatively lower index of refraction with a substantially planar surface and an elongate open channel therein,
    filling a predetermined middle portion of the channel with an optically conductive waveguide material in a liquid state and having a predetermined relatively higher index of refraction,
    then hardening a middle portion of the waveguide material, placing a fiber optic means in each end of the channel adjacent to each end of the waveguide material with an end of each fiber optic means contacting the adjacent end of the waveguide material, and then
    hardening the rest of the waveguide material to form a continuous waveguide means having a predetermined relatively higher index of refraction and to attach each end thereof to the adjacent end of one said fiber optic means.

2. A method as in claim 1, comprising also attaching a superstrate having a relatively lower index of refraction over at least the waveguide means and the adjacent ends of the fiber optic means.

3. A method as in claim 1, wherein the substrate comprises moldable material, and the channel is provided by pressing molding means into the substantially planar surface.

4. A device as in claim 3, wherein the first fiber optic means is connected to direct light from emitter means into the waveguide means, the second fiber optic means is connected to direct light away from the waveguide means to detector means, the third fiber optic means is connected to direct light away from the waveguide means to reference detector means, and the fourth fiber optic means is connected to direct light away from the waveguide means to sensor means and from the sensor means into the waveguide means.

5. A method as in claim 1, wherein the channel is provided by etching.

6. A method as in claim 5, wherein the substrate comprises material that is hardenable by ultraviolet radiation and the etching comprises photoetching of the substrate through a mask.

7. A method as in claim 1, wherein the waveguide material is hardenable by absorption of a predetermined form of radiation, and the hardening is provided by directing such radiation thereto.

8. A method as in claim 7, wherein the radiation comprises ultraviolet radiation.

9. A method as in claim 7, wherein the waveguide material comprises optical cement.

10. A method as in claim 1, wherein the method is carried out simultaneously in each of a plurality of areas spaced apart in the same substrate.

11. A method as in claim 1, wherein at least one end of the channel is divided into a plurality of subchannels to provide coupling between each subchannel and an adjacent fiber optic means.

12. A method of fabricating a device for optical coupling between multimode fiber optic means via multimode channel waveguide means comprising
    providing a substrate having a predetermined relatively lower index of refraction with a substantially planar surface and an elongate open channel therein,
    placing a conformal coating having a low index of refraction on top of the waveguide channel surface,
    filling a predetermined middle portion of the channel with an optically conductive waveguide material in a liquid state and having a predetermined relatively higher index of refraction,
    placing a fiber optic means in each end of the channel adjacent to each end of the waveguide material with an end of each fiber optic means contacting the adjacent end of the waveguide material, and hardening the waveguide material to form a continuous waveguide means having the predetermined relatively higher index of refraction and to attach each end thereof to the adjacent end of one said fiber optic means.

13. A device for optical coupling between multimode fiber optic means via multimode channel waveguide means comprising a substrate having a predetermined relatively lower index of refraction with a substantially planar surface and an elongate open channel therein, a predetermined middle portion of the channel having been filled with an optically conductive waveguide material in a liquid state and having a predetermined relatively higher index of refraction, a fiber optic means having been placed in each end of the channel adjacent to each end of the waveguide material with an end of each fiber optic means contacting the adjacent end of the waveguide material, the waveguide material having been hardened to form a continuous waveguide means having the predetermined relatively higher index of refraction, after each end thereof had been attached to the adjacent end of one said fiber optic means, the waveguide means being approximately Y-shaped in plan view and providing coupling between first and second fiber optic means, each attached to a different one of the ends of the waveguide on the branched portion of the Y, and a third fiber optic means attached to the end of the waveguide on the single-ended portion of the Y, and comprising also a fourth fiber optic means smaller in cross section than the waveguide on the single-ended portion of the Y and that was placed with its adjacent end therein (while the waveguide material was in the liquid state) between the junction of the Y and the third fiber optic means and bent gradually to one side to extend away from said portion of the waveguide before reaching the end to which the third fiber optic means is attached.

14. A device as in claim 13, comprising also a superstrate having a relatively lower index of refraction attached over at least the waveguide means and the adjacent ends of the fiber optic means.

* * * * *